US012645847B2

(12) United States Patent (10) Patent No.: US 12,645,847 B2
Silva et al. (45) Date of Patent: Jun. 2, 2026

(54) METHOD AND SYSTEM FOR SPACE PLANNING BY ARTIFICIAL INTELLIGENCE REASONING

(71) Applicant: JPMorgan Chase Bank, N.A., New York, NY (US)

(72) Inventors: Rui Manuel Ramos Teixeira Da Silva, London (GB); Alberto Pozanco, Madrid (ES); Parisa Zehtabi, London (GB); Daniele Magazzeni, London (GB); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1185 days.

(21) Appl. No.: 17/647,205

(22) Filed: Jan. 6, 2022

(65) Prior Publication Data

US 2023/0214544 A1 Jul. 6, 2023

(51) Int. Cl.
*G06F 30/13* (2020.01)
*G06F 30/12* (2020.01)
(Continued)

(52) U.S. Cl.
CPC .............. *G06F 30/13* (2020.01); *G06F 30/12* (2020.01); *G06F 30/27* (2020.01); *G06F 2111/04* (2020.01)

(58) Field of Classification Search
CPC ......... G06F 30/13; G06F 30/12; G06F 30/27; G06F 2111/04
See application file for complete search history.

(56) References Cited

U.S. PATENT DOCUMENTS

2016/0189061 A1* 6/2016 Jain ........................ G06Q 10/02
705/5
2020/0234251 A1 7/2020 Ma et al.
(Continued)

OTHER PUBLICATIONS

Dalia H Dorrah, NPL, "Integrated multi-objective optimization and agent-based building occupancy modeling for space layout planning", Elsevier, Journal of Building Engineering, published Oct. 20, 2020 (Year: 2020).*

(Continued)

*Primary Examiner* — Rehana Perveen
*Assistant Examiner* — Angel Calle
(74) *Attorney, Agent, or Firm* — Greenblum & Bernstein, P.L.C.

(57) ABSTRACT

A method and a computing apparatus for allocating space in a building are provided. The method includes: receiving a first input that includes information that relates to a plurality of persons that intend to occupy the building; receiving a second input that includes information that relates to building specifications; receiving a third input that includes information that relates to constraints that are mandatory and preferences that are not mandatory; and determining, based on each of the first input, the second input, and the third input, an allocation of each person to a corresponding space within the building and a respective schedule for each person to occupy the corresponding space. The determination of the allocation and the respective schedule may be effected by applying an artificial intelligence (AI) algorithm that is configured to satisfy all of the mandatory constraints and to optimize a satisfaction of the preferences.

15 Claims, 8 Drawing Sheets

(51) Int. Cl.
   *G06F 30/27*       (2020.01)
   *G06F 111/04*       (2020.01)

(56)               References Cited

U.S. PATENT DOCUMENTS

| | | | |
|---|---|---|---|
| 2020/0234590 A1* | 7/2020 | Ma | G06Q 10/06398 |
| 2020/0272956 A1 | 8/2020 | Livnat | |
| 2021/0313075 A1* | 10/2021 | Mc Namara | G08B 21/182 |

OTHER PUBLICATIONS

International Search Report and Written Opinion in International Patent Application No. PCT/US2022/052259, dated Mar. 15, 2023.

\* cited by examiner

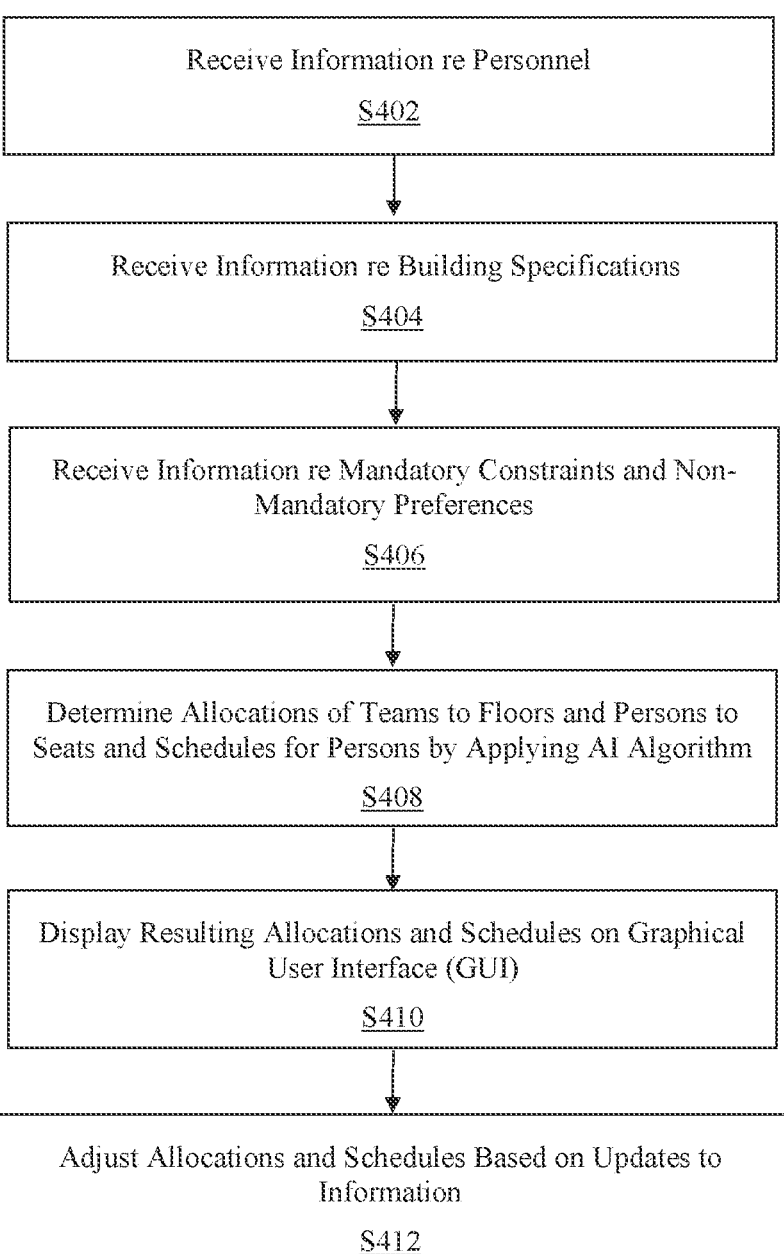

400

Receive Information re Personnel

S402

Receive Information re Building Specifications

S404

Receive Information re Mandatory Constraints and Non-Mandatory Preferences

S406

Determine Allocations of Teams to Floors and Persons to Seats and Schedules for Persons by Applying AI Algorithm

S408

Display Resulting Allocations and Schedules on Graphical User Interface (GUI)

S410

Adjust Allocations and Schedules Based on Updates to Information

Team Assignment

Assignments

| Group | Floor Number |
|---|---|
| filter data... | |
| ATHENA STRATEGIES | 03 |
| BREXIT - CIB MGT | 03 |
| BUSINESS RESILIENCY - EMEA | 03 |
| CAMPUS RECRUITING - EMEA | 03 |
| CATEGORY SOURCING EMEA | 03 |
| CCBSI BUSINESS MGMT | 03 |
| CIB FINANCE CONTROL TEAM & MGMT PC | 03 |
| COMMERCIAL BANK COMPLIANCE | 03 |

Floor Usage

| Floor Number | Capacity | | Assignment | | |
|---|---|---|---|---|---|
| | All Seats | Offices | Num Teams | Seats Required | Offices Required |
| 03 | 587 | 27 | 40 | 548 | 24 |
| 04 | 987 | 33 | 38 | 762 | 32 |
| 05 | 957 | 36 | 30 | 401 | 35 |
| 06 | 1002 | 32 | 33 | 448 | 31 |
| 07 | 156 | 14 | 47 | 142 | 13 |
| 10 | 281 | 13 | 9 | 71 | 12 |
| 11 | 262 | 16 | 44 | 187 | 15 |
| 12 | 284 | 14 | 28 | 130 | 13 |
| 14 | 286 | 13 | 16 | 92 | 12 |
| 15 | 325 | 15 | 33 | 188 | 14 |
| 16 | 277 | 20 | 40 | 195 | 19 |
| 17 | 281 | 18 | 16 | 91 | 15 |
| 18 | 277 | 19 | 32 | 184 | 17 |
| 22 | 226 | 21 | 37 | 176 | 20 |
| 23 | 265 | 21 | 35 | 174 | 20 |
| 24 | 271 | 18 | 30 | 260 | 17 |
| 25 | 290 | 16 | 27 | 105 | 15 |
| 26 | 254 | 16 | 33 | 232 | 15 |
| 27 | 268 | 30 | 29 | 196 | 29 |
| 28 | 240 | 24 | 32 | 189 | 22 |
| 29 | 241 | 27 | 30 | 215 | 26 |
| 30 | 129 | 25 | 33 | 123 | 22 |
| Total: 22 | 8146 | 468 | 692 | 5109 | 438 |

FIG. 6B

GLOBAL EQUITIES
RATES
PRODUCT MANAG
EXECUTION
DIGITAL CLIENT S
ANALYTICS AI ML
Buffer Seats

700

METHOD AND SYSTEM FOR SPACE PLANNING BY ARTIFICIAL INTELLIGENCE REASONING

BACKGROUND

1. Field of the Disclosure

This technology generally relates to methods and systems for planning of real estate usage, and more particularly to methods and systems for using artificial intelligence and machine learning techniques to optimize real estate usage and space planning.

1. Background Information

New hybrid work patterns are becoming available to the workforce, allowing employees to work from home or from the office in different days of the week. These hybrid models create opportunities of reducing real-estate utilization through the joint optimization of: 1) the scheduling of the employees' work patterns, and 2) the allocation of the employees to the available space. Accordingly, there is an objective of providing a capability of identifying opportunities for real estate optimization under different "what-if?" scenarios that can result in significant reduction of energy consumption and real estate costs. This is especially relevant nowadays, given the increasing interest in Environmental, Social and Corporate Governance (ESG) standards.

The allocation of spaces in a given building may need to be re-optimized for a number of reasons. First, team size changes: The sizes of teams may change over time. While some teams may grow, thus requiring more space, others may shrink, thus requiring less seats. Moreover, the number of part-time employees and contractors may also fluctuate with business needs. As a result, a given seat allocation can quickly become suboptimal as time progresses. As such, it is important to regularly re-allocate seating in a building to more optimally accommodate the new business needs.

Second, temporary changes in space may be available: A particular seating capacity may vary over time. As an example, the social/physical distancing norms imposed due to infectious diseases, such as, for example, the COVID-19 pandemic have effectively more than halved the seating capacity in most buildings, through the introduction of available and unavailable seats. More generally, temporary construction works or remodeling disruptions in the building may also require temporary re-allocations of some seats.

Third, introduction of hybrid work models: New hybrid work models and flexible seating strategies are being rolled out by different firms. Hybrid work models provide employees with the flexibility to work from home or from the office at different times. Flexible seating strategies have replaced the traditional fixed seat assignments, allowing employees to choose their seats. Employees may choose seats on a first-come first-serve basis. These new hybrid work models and flexible seating strategies have rendered previous seat allocations as suboptimal from a real-estate utilization perspective.

The aforementioned flexible work models may require more frequent re-optimizations to more efficiently accommodate the flexible work patterns of employees. There are, however, opportunities to optimize space even further, when the scheduling of the employees' work patterns is performed jointly with the space allocation optimization. In general, there are multiple work patterns that can satisfy employees' preferences. For example, there are multiple patterns that allow an employee to work three days per week in the office. As such, a joint optimization of both the schedules and the space allocations may allow for greater real estate utilization reductions.

Challenges associated with optimizing space allocations in a building: There are a number of challenges associated with the re-optimization of the space allocations in a building. First, large scale of the problem: A typical building may function as the workplace for hundreds of teams and thousands of employees. The large scale of an employee population can quickly render the optimization of space allocations intractable when performed manually.

Second, multiple constraints and preferences: There are multiple constraints and requirements that need to be satisfied and/or optimized on a building re-allocation. These requirements may range from hard constraints, i.e., constraints that must necessarily be satisfied, such as equipment requirements, accessibility requirements, compliance, and laws, among others, to soft constraints, i.e., human preferences and/or business preferences. Hard constraints make it challenging to find a solution that satisfies all the requirements. Soft constraints introduce challenges in establishing tradeoffs over which preferences should be satisfied, when there is no solution that satisfies them all.

Third, difficulty in reasoning over different scenarios: The scale and complexity of the problem may make it difficult to generate multiple different solutions for the scheduling of the employees and the space allocation of the building, under different constraints and preferences. This may prevent the users from understanding the impact of such constraints/preferences in the final solution, as well as the underlying tradeoffs associated with each of them.

These challenges render the manual optimization of a building's spaces as a complex, time-consuming and error-prone process. Accordingly, there is a need for an automated artificial intelligence (AI) system that is designed to support a human user in the optimization of the allocation of a population in a given building, under a set of constraints and preferences, and with a goal of optimizing real-estate utilization.

SUMMARY

The present disclosure, through one or more of its various aspects, embodiments, and/or specific features or sub-components, provides, inter alia, various systems, servers, devices, methods, media, programs, and platforms for using artificial intelligence and machine learning techniques to optimize real estate usage and space planning.

According to an aspect of the present disclosure, a method for allocating space in a building is provided. The method is implemented by at least one processor. The method includes: receiving, by the at least one processor, a first input that includes information that relates to a plurality of persons that intend to occupy space within the building; receiving, by the at least one processor, a second input that includes information that relates to building specifications; receiving, by the at least one processor, a third input that includes information that relates to constraints that are mandatory and preferences that are not mandatory; and determining, by the at least one processor based on each of the first input, the second input, and the third input, an allocation of each respective one of the plurality of persons to a corresponding space within the building and a respective schedule for each respective one of the plurality of persons to occupy the corresponding space.

The determining of the allocation and the respective schedule may include applying an artificial intelligence (AI) algorithm that is configured to satisfy all of the mandatory constraints and to optimize a satisfaction of the preferences.

The AI algorithm may be further configured to minimize a number of floors within the building that are occupied as a result of the allocation.

Each respective one of the plurality of persons may be designated as a member of a respective team. The allocation may include a first assignment of each respective team to at least one respective floor within the building and a second assignment of each respective member of a respective team to a respective seat within the at least one respective floor to which the respective team is assigned.

The method may further include displaying, via a graphical user interface (GUI), a result of the determining of the allocation and the respective schedules.

The GUI may be configured to prompt a user to provide at least one from among the first input, the second input, and the third input.

When a determination is made that at least one mandatory constraint cannot be satisfied, the method may further include displaying, via the GUI, a message that notifies the user of an impossibility to obtain an allocation and a set of respective schedules that satisfies all mandatory constraints, the message including explanatory information that indicates a conflict that relates to the impossibility.

The method may further include displaying, via the GUI, at least one metric from among a first metric that relates to a number of floors required by the allocation and a second metric that relates to an occupancy percentage of each floor.

The method may further include: displaying, via the GUI, a prompt that facilitates receiving a fourth input that includes adjustments to the information received in the third input; determining, by the at least one processor based on each of the first input, the second input, and the fourth input, an updated allocation of each respective one of the plurality of persons to a corresponding space within the building and an updated respective schedule for each respective one of the plurality of persons to occupy the corresponding space; and displaying, via the GUI, a result of the determining of the updated allocation and the updated schedules.

According to another aspect of the present disclosure, a computing apparatus for allocating space in a building is provided. The computing apparatus includes a processor; a memory; a display; and a communication interface coupled to each of the processor, the memory, and the display. The processor is configured to: receive, via the communication interface, a first input that includes information that relates to a plurality of persons that intend to occupy space within the building; receive, via the communication interface, a second input that includes information that relates to building specifications; receive, via the communication interface, a third input that includes information that relates to constraints that are mandatory and preferences that are not mandatory; and determine, based on each of the first input, the second input, and the third input, an allocation of each respective one of the plurality of persons to a corresponding space within the building and a respective schedule for each respective one of the plurality of persons to occupy the corresponding space.

The processor may be further configured to determine the allocation and the respective schedule by applying an artificial intelligence (AI) algorithm that is configured to satisfy all of the mandatory constraints and to optimize a satisfaction of the preferences.

The AI algorithm may be further configured to minimize a number of floors within the building that are occupied as a result of the allocation.

Each respective one of the plurality of persons may be designated as a member of a respective team. The allocation may include a first assignment of each respective team to at least one respective floor within the building and a second assignment of each respective member of a respective team to a respective seat within the at least one respective floor to which the respective team is assigned.

The processor is further configured to cause the display to display, via a graphical user interface (GUI), a result of the determination of the allocation and the respective schedules.

The GUI may be configured to prompt a user to provide at least one from among the first input, the second input, and the third input.

When a determination is made that at least one mandatory constraint cannot be satisfied, the processor may be further configured to cause the display to display, via the GUI, a message that notifies the user of an impossibility to obtain an allocation and a set of respective schedules that satisfies all mandatory constraints, the message including explanatory information that indicates a conflict that relates to the impossibility.

The processor may be further configured to cause the display to display, via the GUI, at least one metric from among a first metric that relates to a number of floors required by the allocation and a second metric that relates to an occupancy percentage of each floor.

The processor may be further configured to: cause the display to display, via the GUI, a prompt that facilitates receiving a fourth input that includes adjustments to the information received in the third input; determine, based on each of the first input, the second input, and the fourth input, an updated allocation of each respective one of the plurality of persons to a corresponding space within the building and an updated respective schedule for each respective one of the plurality of persons to occupy the corresponding space; and cause the display to display, via the GUI, a result of the determination of the updated allocation and the updated schedules.

According to yet another aspect of the present disclosure, a non-transitory computer readable storage medium storing instructions for allocating space in a building is provided. The storage medium includes executable code which, when executed by a processor, causes the processor to: receive a first input that includes information that relates to a plurality of persons that intend to occupy space within the building; receive a second input that includes information that relates to building specifications; receive a third input that includes information that relates to constraints that are mandatory and preferences that are not mandatory; and determine, based on each of the first input, the second input, and the third input, an allocation of each respective one of the plurality of persons to a corresponding space within the building and a respective schedule for each respective one of the plurality of persons to occupy the corresponding space.

The executable code may be further configured to cause the processor to determine the allocation and the respective schedule by applying an artificial intelligence (AI) algorithm that is configured to satisfy all of the mandatory constraints and to optimize a satisfaction of the preferences.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using artificial intelligence and machine learning techniques to optimize real estate usage and space planning.

FIGS. 6A and 6B are charts that illustrate an example of team-floor assignments and floor usage that are displayable on a graphical user interface and are generated by performing a method for using artificial intelligence and machine learning techniques to optimize real estate usage and space planning, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
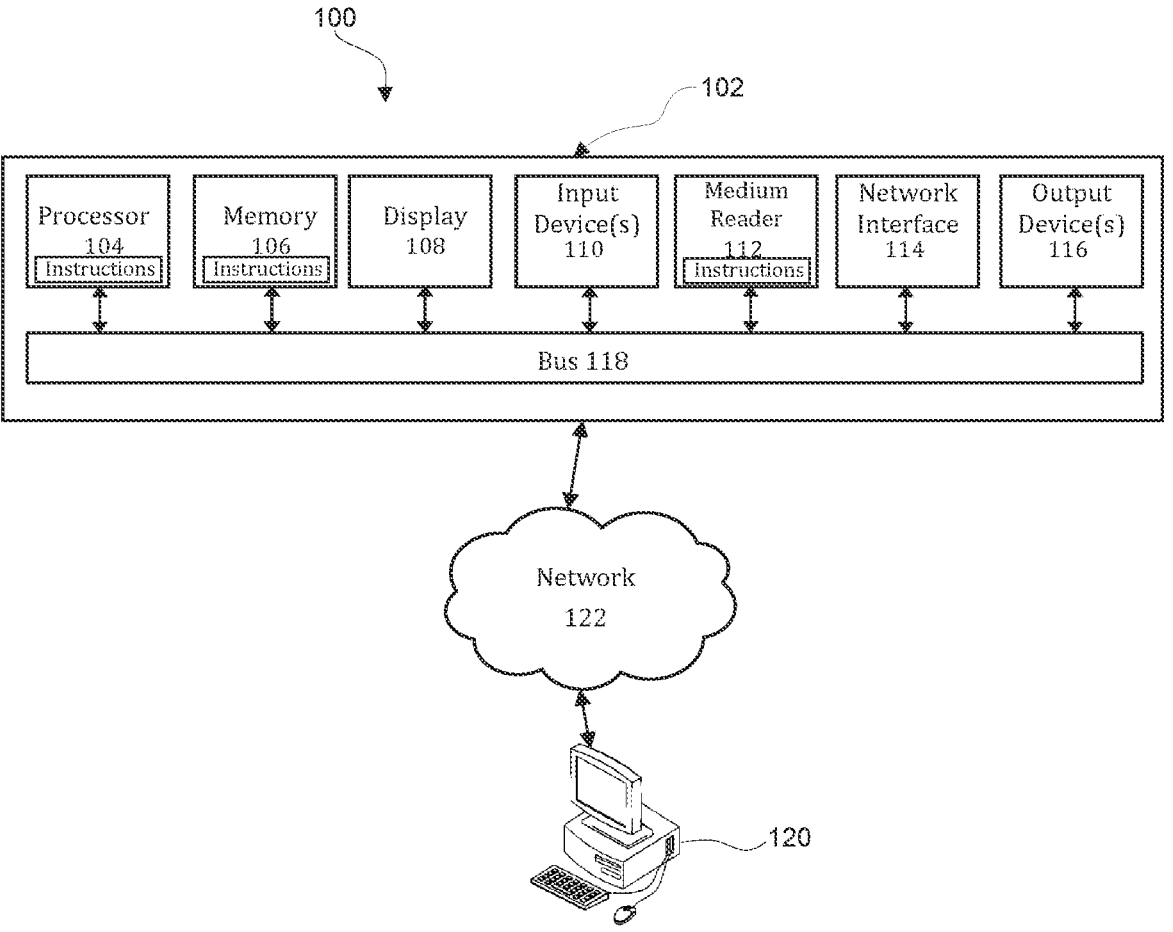
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infra-red, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using artificial intelligence (AI) and machine learning techniques to optimize real estate usage and space planning.

Figure 2:
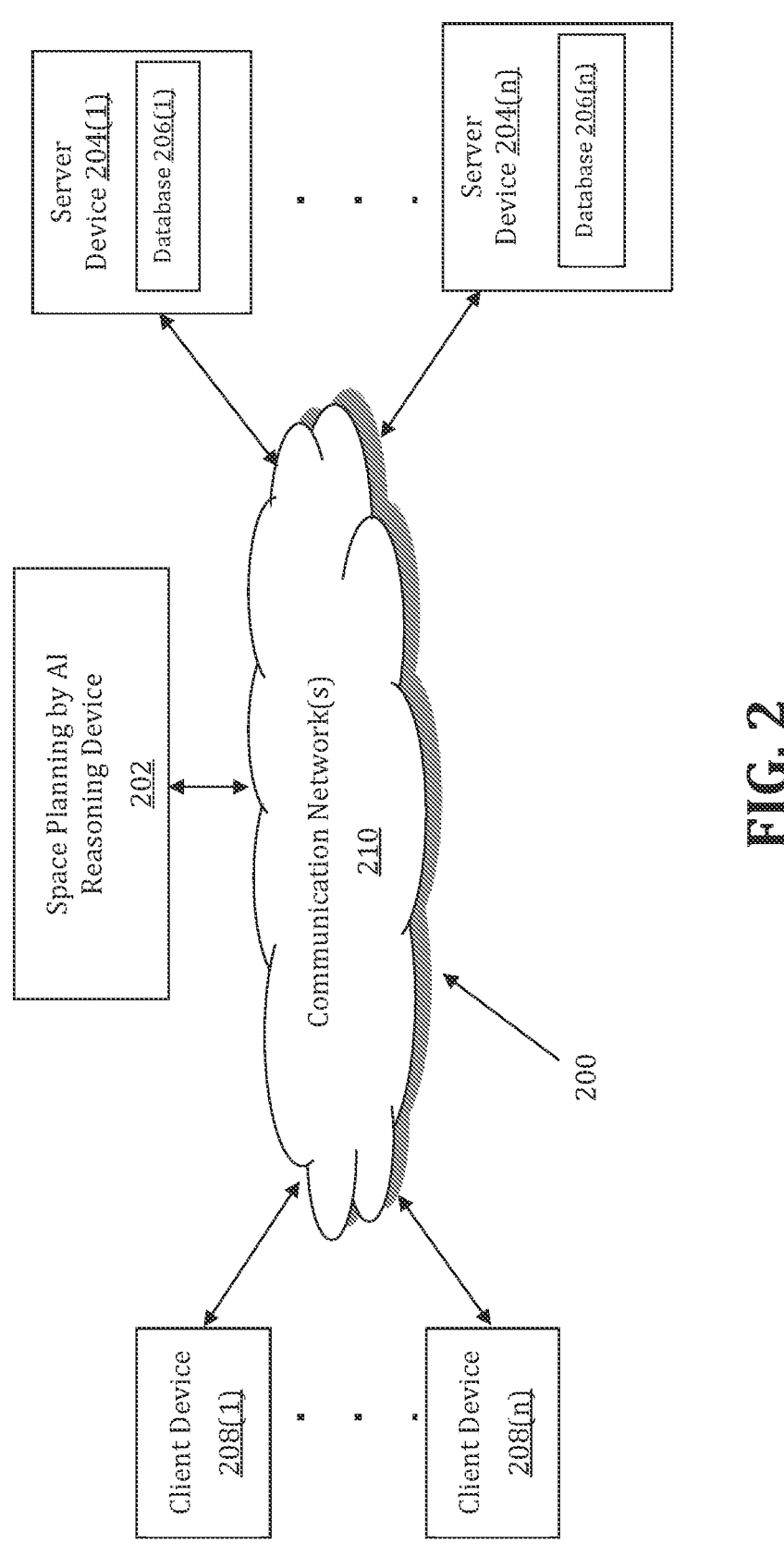
FIG. 2 illustrates an exemplary diagram of a network environment.

Referring to FIG. 2, a schematic of an exemplary network environment 200 for implementing a method for using artificial intelligence (AI) and machine learning techniques to optimize real estate usage and space planning is illustrated. In an exemplary embodiment, the method is executable on any networked computer platform, such as, for example, a personal computer (PC).

The method for using AI and machine learning techniques to optimize real estate usage and space planning may be implemented by a Space Planning by AI Reasoning (SPAIR) device 202. The SPAIR device 202 may be the same or similar to the computer system 102 as described with respect to FIG. 1. The SPAIR device 202 may store one or more applications that can include executable instructions that, when executed by the SPAIR device 202, cause the SPAIR device 202 to perform actions, such as to transmit, receive, or otherwise process network messages, for example, and to perform other actions described and illustrated below with reference to the figures. The application(s) may be implemented as modules or components of other applications.

Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SPAIR device 202 itself, may be located in virtual server(s) running in a cloud-based computing environment rather than being tied to one or more specific physical network computing devices. Also, the application(s) may be running in one or more virtual machines (VMs) executing on the SPAIR device 202. Additionally, in one or more embodiments of this technology, virtual machine(s) running on the SPAIR device 202 may be managed or supervised by a hypervisor.

In the network environment 200 of FIG. 2, the SPAIR device 202 is coupled to a plurality of server devices 204(1)-204(n) that hosts a plurality of databases 206(1)-206(n), and also to a plurality of client devices 208(1)-208(n) via communication network(s) 210. A communication interface of the SPAIR device 202, such as the network interface 114 of the computer system 102 of FIG. 1, operatively couples and communicates between the SPAIR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SPAIR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SPAIR devices that efficiently implement a method for using AI and machine learning techniques to optimize real estate usage and space planning.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SPAIR device 202 may be a standalone device or integrated with one or more other devices or apparatuses, such as one or more of the server devices 204(1)-204(n), for example. In one particular example, the SPAIR device 202 may include or be hosted by one of the server devices 204(1)-204(n), and other arrangements are also possible. Moreover, one or more of the devices of the SPAIR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SPAIR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to real estate utilization and building specifications and data that relates to personnel schedules and preferences.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SPAIR device 202 via communication network(s) 210. Accordingly, the client devices 208(1)-208(n) may be mobile computing devices, desktop computing devices, virtual computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SPAIR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SPAIR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SPAIR device 202, the server devices 204(1)-204(n), or the client devices 208(1)-208(n), for example, may be configured to operate as virtual instances on the same physical machine. In other words, one or more of the SPAIR device 202, the server devices 204(1)-204(n), or the client devices 208(1)-208(n) may operate on the same physical device rather than as separate devices communicating through communication network(s) 210. Additionally, there may be more or fewer SPAIR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
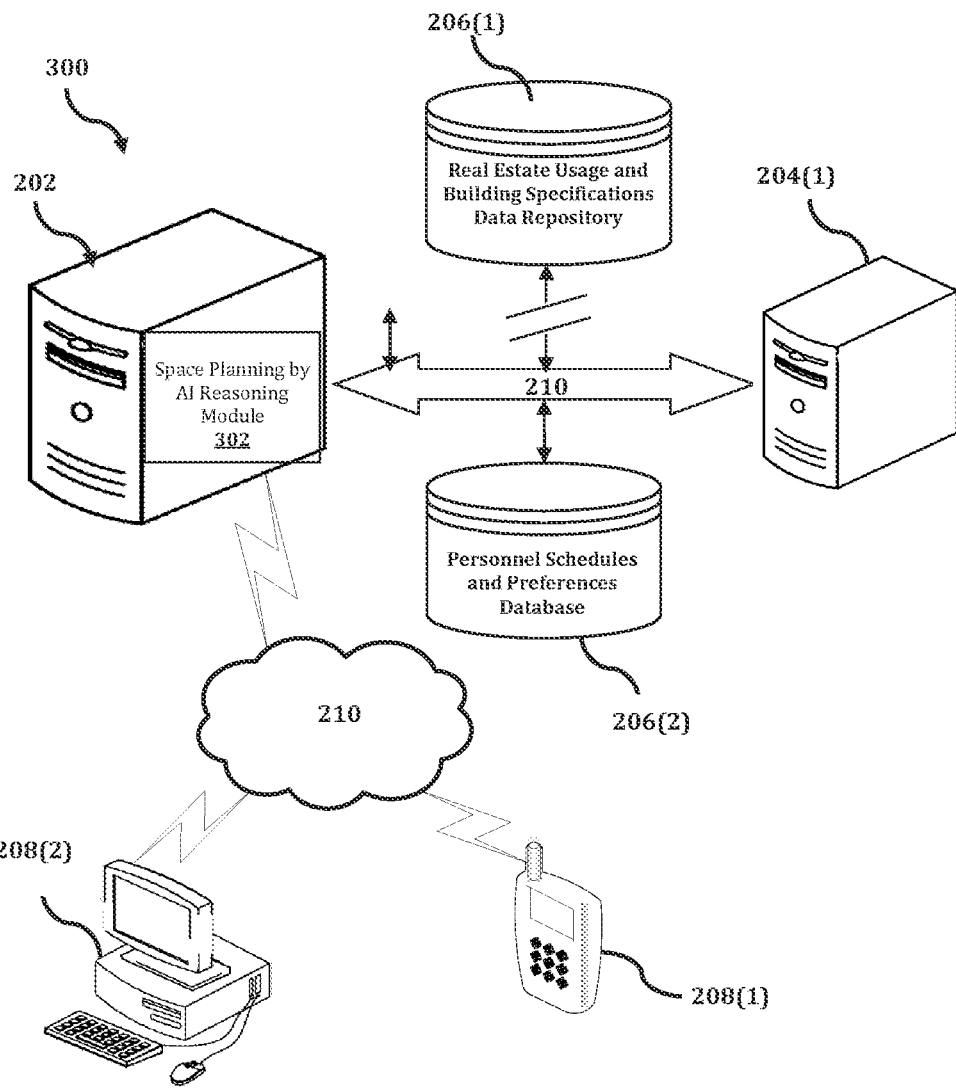
FIG. 3 shows an exemplary system for implementing a method for using artificial intelligence and machine learning techniques to optimize real estate usage and space planning.

The SPAIR device 202 is described and illustrated in FIG. 3 as including a space planning by AI reasoning module 302, although it may include other rules, policies, modules, databases, or applications, for example. As will be described below, the space planning by AI reasoning module 302 is configured to implement a method for using AI and machine learning techniques to optimize real estate usage and space planning.

An exemplary process 300 for implementing a mechanism for using AI and machine learning techniques to optimize real estate usage and space planning by utilizing the network environment of FIG. 2 is illustrated as being executed in FIG. 3. Specifically, a first client device 208(1) and a second client device 208(2) are illustrated as being in communication with SPAIR device 202. In this regard, the first client device 208(1) and the second client device 208(2) may be "clients" of the SPAIR device 202 and are described herein as such. Nevertheless, it is to be known and understood that the first client device 208(1) and/or the second client device 208(2) need not necessarily be "clients" of the SPAIR device 202, or any entity described in association therewith herein. Any additional or alternative relationship may exist between either or both of the first client device 208(1) and the second client device 208(2) and the SPAIR device 202, or no relationship may exist.

Further, SPAIR device 202 is illustrated as being able to access a real estate usage and building specifications data repository 206(1) and a personnel schedules and preferences database 206(2). The space planning by AI reasoning module 302 may be configured to access these databases for implementing a method for using AI and machine learning techniques to optimize real estate usage and space planning.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SPAIR device 202 via broadband or cellular communication. Of course, these embodiments are merely exemplary and are not limiting or exhaustive.

Upon being started, the space planning by AI reasoning module 302 executes a process for using AI and machine learning techniques to optimize real estate usage and space planning. An exemplary process for using AI and machine learning techniques to optimize real estate usage and space planning is generally indicated at flowchart 400 in FIG. 4.

In process 400 of FIG. 4, at step S402, the space planning by AI reasoning module 302 receives a first set of data that relates to personnel that intend to occupy space within a building, such as, for example, an employee population. In an exemplary embodiment, a graphical user interface (GUI) may be displayed on a screen, and a user may be prompted to enter one or more files that include personnel information. The personnel information may include, for example, any one or more of a name of a person, a team to which the person belongs and/or a department or other organization to which the person is assigned, a work status such as full-time or part-time, and/or any other suitable types of information that relate to the person.

At step S404, the space planning by AI reasoning module 302 receives a second set of data that relates to building specifications. In an exemplary embodiment, the GUI may include a prompt to facilitate entry of one or more files that include building-specific information. The building specifications may include, for example, any one or more of a number of floors that are available for occupancy, a number of available seats on each floor, a floor plan layout for each floor, and/or any other suitable types of information that relate to the building.

At step S406, the space planning by AI reasoning module 302 receives a third set of data that relates to mandatory constraints and non-mandatory preferences. In an exemplary embodiment, the user may be prompted by the GUI to enter one or more files that include constraints that are mandatory and/or preferences. The mandatory constraints may include, for example, a minimum number of hours per week that a particular person will occupy space within the building, required schedule specifications for the particular person, a requirement that a particular team must occupy a specific floor, and/or any other requirements that pertain to the particular person and/or the particular team. The non-mandatory preferences may include, for example, personal preferences regarding which day(s) of the week that the particular person is scheduled to occupy space within the building, preferences regarding proximity of the particular person to at least one other person, preferences regarding spatial proximity between teams (e.g., a preference that a particular team be situated relatively nearby to another team), and/or any other types of preferences that relate to space allocation and scheduling. The constraints and preferences may be specified at either or both of an individual level and a team level.

At step S408, the space planning by AI reasoning module 302 uses each of the first set of data, the second set of data, and the third set of data to determine an allocation of each respective person to a corresponding space within the building and a schedule for each respective person. In an exemplary embodiment, the determination of the allocation and the schedule is effected by applying an artificial intelligence (AI) algorithm that is configured to satisfy all of the mandatory constraints and to optimize a satisfaction of the preferences.

In an exemplary embodiment, the allocation includes a first assignment of each respective team to at least one floor within the building and a second assignment of each member of a particular team to a seat on one of the floors to which the particular team is assigned. In an exemplary embodiment, the AI algorithm is further configured to optimize real estate utilization by, for example, minimizing a number of floors within the building that are occupied as a result of the allocation, avoiding or minimizing disruption that may arise due to the allocation, accounting for fairness considerations, and/or considering any other suitable factor that relates to optimization of real estate utilization.

At step S410, the space planning by AI reasoning module 302 displays, via the GUI, a result of the determination of the allocation and the schedule. In an exemplary embodiment, the GUI may display a list of teams by name together with corresponding floor assignments. The GUI may also display floor usage information, such as numbers of assigned seats and/or offices on a floor-by-floor basis. The GUI may also display pictorial depictions of floor plans that illustrate locations of seats and offices within a particular floor and color-coded notations that indicate occupancy by persons that belong to certain teams. The GUI may also display various metrics that relate to real estate usage, such as, for example, a first metric that relates to a number of floors required by the allocation and a second metric that relates to an occupancy percentage of each floor, and/or any other suitable type of metric.

In an exemplary embodiment, when a determination is made that it is impossible to satisfy all of the mandatory constraints that have been provided, the GUI may display a message that notifies the user of an impossibility to obtain an allocation and/or a schedule that satisfies all mandatory constraints. The message may also include explanatory information that indicates one or more conflicts among the mandatory constraints that result in the impossibility.

At step S412, the space planning by AI reasoning module 302 adjusts the allocation and/or the schedule based on updated information that relates to the personnel, the building, the mandatory constraints, and/or the preferences. In an exemplary embodiment, the GUI includes a prompt that enables a user to enter updated data upon which an adjustment to the allocation and/or the schedule may be based. In an exemplary embodiment, when a determination is made that it is impossible to satisfy all of the indicated mandatory constraints, the user may be prompted to enter updated data in order to resolve conflicts that result in the impossibility, and a new allocation and/or schedule may be generated based on the updated data.

In an exemplary embodiment, the adjusting of the allocation and/or the schedule may be implemented by the use of an assistant that searches for a relatively small set of changes to the constraints and/or preferences that would result in significant real-estate utilization reductions and savings. In an exemplary embodiment, the AI algorithm is further configured to automatically perform such searches and to present suggestions for such adjustments to the user via the GUI.

In an exemplary embodiment, new hybrid work patterns are becoming available to the workforce, allowing employees to work from home or from the office in different days of the week. These hybrid models create opportunities of reducing real-estate utilization through the joint optimization of: 1) the scheduling of the employees' work patterns, and 2) the allocation of the employees to the available space. In an exemplary embodiment, a capability of identifying opportunities for real estate optimization under different "what-if?" scenarios that can result in significant reduction of energy consumption and real estate costs is provided.

Figure 5:
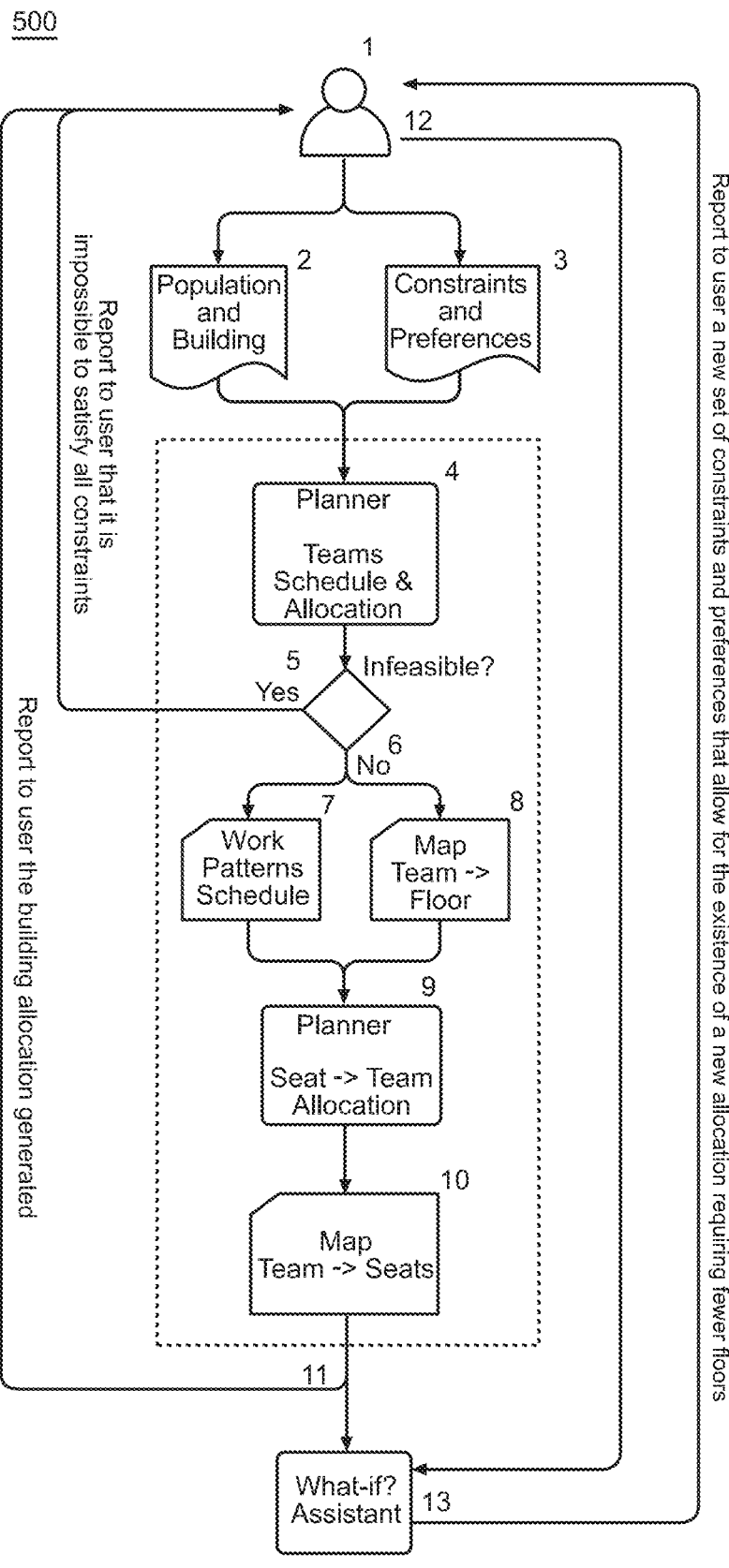
FIG. 5 is a flow diagram that illustrates a process logic in a method for using artificial intelligence and machine learning techniques to optimize real estate usage and space planning, according to an exemplary embodiment.

FIG. 5 is a flow diagram 500 that illustrates a process logic in a method for using artificial intelligence and machine learning techniques to optimize real estate usage and space planning, according to an exemplary embodiment. In summary, a user starts by providing as inputs 1) an employee population to be allocated; 2) details on the building where the population is to be allocated; and 3) the constraints that must be satisfied, and the preferences that should be optimized in the resulting allocation. An AI planner parses these inputs provided by the user, and outputs as a solution: 1) an allocation of teams to floors, and a schedule following the selected hybrid work model; and 2) an allocation of seats to teams. In an exemplary embodiment, these allocations simultaneously satisfy all constraints, optimize the preferences specified by the user, and minimize the real-estate utilization. Alongside the resulting allocations, the system can return metrics that allow the user to assess the overall quality of the allocations. These metrics can include information on the number of floors required by the solution, and the occupancy percentage of each floor, among others.

In an exemplary embodiment, the user can then explore the space of "what-if?" scenarios by changing the constraints and preferences and planning again. However, the space of constraints and preferences that can be changed can grow quite large, thus rendering it difficult to predict the impact of such changes. The user can instead use the "What-if? Assistant" to quickly search for a small set of changes to the constraints and preferences that suggest a solution where fewer floors are required.

Referring again to FIG. 5, the process logic includes the following steps: 1) A user utilizes the AI system to automatically schedule an employee population and allocate the employee population within a building. 2) The user provides, as inputs, information about the employee population to schedule and allocate, and information about the target building. 3) The user specifies the constraints to be satisfied and the preferences to be optimized. 4) A planner performs the scheduling of the employee population according to the work model selected, as well as their allocation to floors of the building. The scheduling and allocation must simultaneously satisfy all constraints specified by the user, optimize the preferences specified by the user, and minimize the number of floors used in the resulting allocation. 5) The user is alerted if there is not a schedule and floor allocation that satisfies all of the specified constraints. At that point, the user can relax the constraints to make a solution possible. 6) When the planner can compute a schedule and allocations of teams to floors that satisfies all constraints specified, the system proceeds to the allocation of seats on each floor to the different teams assigned therein. 7) The schedules are assigned to the different teams or employees, following the hybrid work model selected. 8) The allocation of teams to different floors in the building is made. 9) A planner assigns the seats to the different teams allocated to each floor. The seat allocation seeks to satisfy all constraints specified by the user, while minimizing the overall distance between seats assigned to each team. 10) The allocation of seats to teams is made. 11) The resulting allocations are returned to the user. Different metrics of interest are also provided to the user. 12) The user assesses the allocations returned as well as the associated metrics. The user may use the "What-if? Assistant" to quickly explore different what-if? scenarios. The "What-if? Assistant" searches for a small set of changes to the constraints and preferences specified by the user that allows the existence of a new allocation requiring fewer floors. 13) The "What-if? Assistant" provides a new set of constraints and preferences that allows the existence of an allocation requiring fewer floors.

Population and building inputs: In an exemplary embodiment, the population input is provided in a standard tabular format in a spreadsheet. The population input may include, for example, any one or more of general employee identification information (e.g., a name and/or an identification number) and business-related information, such as, for example, job title, team hierarchy, and/or management hierarchy. This information may be extractable from internal human resources (HR) systems.

In an exemplary embodiment, the building input is provided in different modalities. This input may include overall space information, specifying available floors, the seats available in each floor, and a classification of each seat, i.e., whether the seat corresponds to an office or not. Additionally, this input may include information about existing seat assignments, such as, for example, maps between employees and seats. Both the space and current seat assignment data may be provided in tabular format in a spreadsheet. Finally, the building input may include the floorplans of all floors in the building. In an exemplary embodiment, the floorplans may be provided in scalable vector graphics (SVG) format. All this information may be extractable from internal real estate management systems.

Constraints and preferences: In an exemplary embodiment, flexibility in supporting multiple different constraints and preferences is provided.

Rotational model: The optimization may be performed assuming different hybrid work models, each specifying a different way the teams/employees rotate between working from home and from the office. Examples include: a weekly rotational model, a pattern-based rotational model, and a fixed seat rotational model. In the weekly rotational model, each week an entire team may be assigned to either work from home or from the office. In the pattern-based rotational model, each team is assigned a pattern from among a predefined set of available patterns, thereby specifying the days that the team works from home or from the office. In the fixed seat rotational model, each team is allocated a fixed number of seats that is proportional to the team size, such as, for example, 60%. Those seats are available to the team every day of the week, and it is then up to the manager of the team to decide how to rotate the team's employees on the available seats.

Fixed floor allocations: Some teams or sets of employees must work on a specific floor. This may be due to compliance rules or laws, equipment restrictions, or, more generally, strategic reasons. These constraints allow the user to manually specify specific team-floor allocations that should not be optimized by the planner.

Separation constraints: Some teams may not have specific fixed floor allocation restrictions, but instead they may not be allowed to be located in the same floor as some other teams. Separation constraints allow the user to specify teams that should be allocated to different areas/floors.

Vicinity constraints: In contrast with separation constraints, vicinity constraints allow the user to specify teams that should be allocated to the same floor. There are multiple reasons for requiring some teams to be located in the same floor. One possible reason is that some teams collaborate often.

Seat requirements: Some employees may have specific seat requirements. For example, some employees may need an office due to their job title. Other employees may require specific seats due to accessibility reasons. These requirements can be specified at different resolutions. For example, they can be specified at the individual level (e.g., "John Smith" requires an office), or by grouping sets of individuals based on a given property (e.g., "all managing directors require an office").

Buffer seats: Teams are flexible and can grow over time. This set of constraints allows the user to specify a number of additional seats to be added to different teams in order to create more flexible seat allocations. The buffer seats can be specified as a percentage of the current team size or in absolute terms.

Planner—Team-Floor Allocation: In an exemplary embodiment, the planner allocating teams to different floors relies on AI techniques based on constraint reasoning. In particular, the allocation problem may be framed as an optimization problem with integer variables—i.e., a Mixed Integer Linear Program. Solving this optimization problem corresponds to finding a solution that minimizes a given objective function while satisfying all the constraints imposed.

In an exemplary embodiment, an objective function that evaluates a given allocation of teams to floors according to different metrics is formulated:

Number of floors required: An important metric relates to the number of floors required in the building to accommodate the allocation proposed—in an exemplary embodiment, the fewer the floors required, the better.

Allocation disruption: A new allocation of teams to floors may allow great cost reductions by reducing the number of floors required to host the employee population. However, this allocation may come at the expense of a significant disruption—i.e., a significant number of people that have to be moved. Assuming an existing seat allocation is provided, a second metric can be considered to assess the effort associated with executing the new allocation proposed. This effort may be formulated as a function of either the number of people or teams that need to be moved to a new floor.

Fairness: A fairness metric may be considered when adopting rotational models that specify the frequency of each team in the office—for example, in the weekly rotational model. In this particular rotational model, an example of a fairness metric is to assess whether the schedule is balanced—i.e., if the teams visit the office a similar number of times during a given period.

In an exemplary embodiment, these metrics may be ranked according to importance. Depending on the ranking considered, different optimal solutions may be computed.

The constraints to be specified in the model include those described above. Note that some sets of constraints may make the optimization problem infeasible, i.e., it may be impossible to find an allocation of teams to floors that satisfies all of the constraints.

FIGS. 6A and 6B are charts 600 and 620 that illustrate an example of team-floor assignments and floor usage that are displayable on a graphical user interface and are generated by performing a method for using artificial intelligence and machine learning techniques to optimize real estate usage and space planning, according to an exemplary embodiment.

Planner—Seat-Team Allocation: The computation of allocations of teams to floors is described above. For each floor in such an allocation, an assignment of the seats therein can then be made to the corresponding teams. The inputs of this planner include the following.

Floorplan: The floorplan lists all the seats in the floor, depicting a corresponding Seat Identification (ID) on its physical location.

Distance between seats: Lists the distance between all pairs of seats. In an exemplary embodiment, this distance is unitless, as the primary concern relates to the relative distance between seats. Note that the user may choose to penalize seats that require the traversal of doors, by adding a penalty in their distance.

Space information: Lists properties of the different seats. Represented as a map between Seat ID and different properties, such as whether the seat corresponds to an office or a standard desk.

In an exemplary embodiment, the problem may be framed as an optimization problem with integer variables. An objective function that evaluates a given allocation of seats to teams according to different metrics may then be formulated.

Cohesiveness: An important metric relates to an average distance between seats allocated to each team—in an exemplary embodiment, the smaller this distance, the better.

Allocation Disruption: Assuming that a team is allocated to its current floor, and assuming that an existing seat allocation is provided, a second metric can be considered to assess the effort associated in executing the new allocation. In an exemplary embodiment, this effort may be formulated as a function of the number of seats that are allocated to new teams.

In an exemplary embodiment, the constraints specified in the model may include the following:

Seat Requirements: Different employees may have specific seat requirements. These constraints enforce solutions that satisfy such requirements.

Fixed Seat Allocations. Some teams or sets of employees must work on specific seats. This may be motivated by different reasons, including compliance rules, equipment requirements, or even strategic reasons. These constraints allow the user to manually specify specific team-floor allocations that should not be optimized by the planner.

Figure 7:
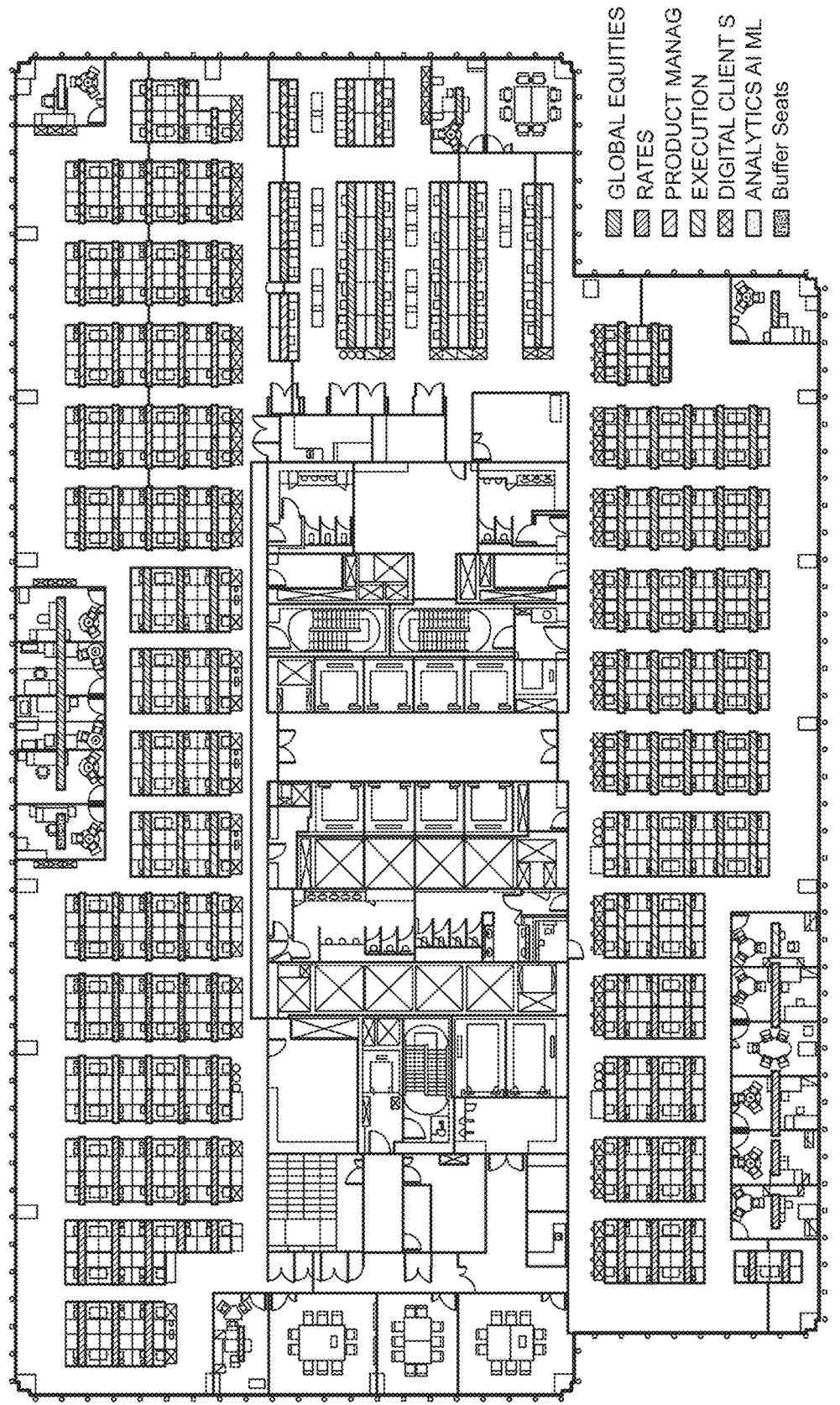
FIG. 7 is a diagram that illustrates an example of seat allocation output that is displayable on a graphical user interface and is generated by performing a method for using artificial intelligence and machine learning techniques to optimize real estate usage and space planning, according to an exemplary embodiment.

FIG. 7 is a diagram 700 that illustrates an example of seat allocation output that is displayable on a graphical user interface and is generated by performing a method for using artificial intelligence and machine learning techniques to optimize real estate usage and space planning, according to an exemplary embodiment. As indicated by the legend at the top right portion of the diagram 700, a possible allocation of six teams on a particular floor is depicted. In an exemplary embodiment, color coding may be used to refer to different teams.

"What-if?" Assistant: The planner allows the user to explore different real-estate optimization "what-if?" scenarios. The user can change constraints and/or preferences, plan again, and assess the results. However, the space of constraints and preferences that can be changed grows quickly, rendering it hard to predict the impact of such changes in terms of real-estate savings. In an exemplary embodiment, the "What-if? Assistant" supports the user in exploring this space more efficiently by searching for a small set of changes to the constraints and preferences that allow the existence of a solution where fewer floors are required.

In an exemplary embodiment, the "What-if? Assistant" is formulated as an extension of the Team-Floor allocation Planner, with the following changes;

Inputs: In an exemplary embodiment, an additional input is provided for specifying a desired number of floors. By default, this value corresponds to the number of floors achieved in the last run of the Team-Floor Allocation Planner minus one. Additionally, the user specifies which constraints/preferences can/cannot be optimized by the "What-if? Assistant".

Objective Function: In an exemplary embodiment, the objective function no longer includes a term for minimizing the number of floors required, since this is fixed as a hard constraint.

Constraints: In an exemplary embodiment, a constraint that enforces a specific number of floors to be respected is added. Other constraints are added to allow the planner to selectively enable/disable some constraints and/or preferences.

Additional Capabilities: In an exemplary embodiment, the estimation of seat distances directly floor the floorplans may be improved by accounting for an impact that some obstacles, such as walls and doors, may have on this distance.

Reasoning over energy consumption metrics in the optimization: Different floors may have different energy needs than others. For example, upper floors may have more sun exposure and require more air conditioner (AC) usage. In an exemplary embodiment, the optimization processes may account for different energy metrics.

Joint optimization of multiple buildings: In an exemplary embodiment, the techniques described above may be extended to reason over populations across multiple buildings, and the space savings may result in a reduction in the number of buildings used.

Accordingly, with this technology, an optimized process for using AI and machine learning techniques to optimize real estate usage and space planning is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for allocating space in a building, the method being implemented by at least one processor, the method comprising:

receiving, by the at least one processor, a first input that includes information that relates to a plurality of persons that intend to occupy space within the building;

receiving, by the at least one processor, a second input that includes information that relates to building specifications;

receiving, by the at least one processor, a third input that includes information that relates to constraints that are mandatory and preferences that are not mandatory;

determining, by the at least one processor based on each of the first input, the second input, and the third input, an allocation of each respective one of the plurality of persons to a corresponding space within the building and a respective schedule for each respective one of the plurality of persons to occupy the corresponding space, wherein the corresponding space includes a particular floor within the building, wherein the determining of the allocation and the respective schedule comprises applying an artificial intelligence (AI) algorithm that is configured to satisfy all of the mandatory constraints and to optimize a satisfaction of the preferences, and wherein the AI algorithm is further configured to minimize a number of floors within the building that are occupied as a result of the allocation; and adjusting the allocation or the respective schedule for modification of an occupancy level of the particular floor within the building that results in reduction of energy consumption for the particular floor.

2. The method of claim 1, wherein each respective one of the plurality of persons is designated as a member of a respective team, and wherein the allocation comprises a first assignment of each respective team to at least one respective floor within the building and a second assignment of each respective member of a respective team to a respective seat within the at least one respective floor to which the respective team is assigned.

3. The method of claim 1, further comprising displaying, via a graphical user interface (GUI), a result of the determining of the allocation and the respective schedules.

4. The method of claim 3, wherein the GUI is configured to prompt a user to provide at least one from among the first input, the second input, and the third input.

5. The method of claim 4, wherein when a determination is made that at least one mandatory constraint cannot be satisfied, the method further comprises displaying, via the GUI, a message that notifies the user of an impossibility to obtain the allocation and a set of respective schedules that satisfies all mandatory constraints, the message including explanatory information that indicates a conflict that relates to the impossibility.

6. The method of claim 3, further comprising displaying, via the GUI, at least one metric from among a first metric that relates to a number of floors required by the allocation and a second metric that relates to an occupancy percentage of each floor.

7. The method of claim 3, further comprising:

displaying, via the GUI, a prompt that facilitates receiving a fourth input that includes adjustments to the information received in the third input;

determining, by the at least one processor based on each of the first input, the second input, and the fourth input, an updated allocation of each respective one of the plurality of persons to an updated corresponding space within the building and an updated respective schedule for each respective one of the plurality of persons to occupy the corresponding space; and displaying, via the GUI, a result of the determining of the updated allocation and the updated schedules.

8. A computing apparatus for allocating space in a building, the computing apparatus comprising:

a processor;

a memory;

a display; and a communication interface coupled to each of the processor, the memory, and the display, wherein the processor is configured to:

receive, via the communication interface, a first input that includes information that relates to a plurality of persons that intend to occupy space within the building;

receive, via the communication interface, a second input that includes information that relates to building specifications;

receive, via the communication interface, a third input that includes information that relates to constraints that are mandatory and preferences that are not mandatory; and determine, based on each of the first input, the second input, and the third input, an allocation of each respective one of the plurality of persons to a corresponding space within the building and a respective schedule for each respective one of the plurality of persons to occupy the corresponding space, wherein the corresponding space includes a particular floor within the building, wherein the processor is further configured to determine the allocation and the respective schedule by applying an artificial intelligence (AI) algorithm that is configured to satisfy all of the mandatory constraints and to optimize a satisfaction of the preferences, wherein the AI algorithm is further configured to minimize a number of floors within the building that are occupied as a result of the allocation, and wherein the processor is further configured to:

adjust the allocation or the respective schedule for modification of an occupancy level of the particular floor within the building that results in reduction of energy consumption for the particular floor.

9. The computing apparatus of claim 8, wherein each respective one of the plurality of persons is designated as a member of a respective team, and wherein the allocation comprises a first assignment of each respective team to at least one respective floor within the building and a second assignment of each respective member of a respective team to a respective seat within the at least one respective floor to which the respective team is assigned.

10. The computing apparatus of claim 8, wherein the processor is further configured to cause the display to display, via a graphical user interface (GUI), a result of the determination of the allocation and the respective schedules.

11. The computing apparatus of claim 10, wherein the GUI is configured to prompt a user to provide at least one from among the first input, the second input, and the third input.

12. The computing apparatus of claim 11, wherein when a determination is made that at least one mandatory constraint cannot be satisfied, the processor is further configured to cause the display to display, via the GUI, a message that notifies the user of an impossibility to obtain the allocation and a set of respective schedules that satisfies all mandatory constraints, the message including explanatory information that indicates a conflict that relates to the impossibility.

13. The computing apparatus of claim 10, wherein the processor is further configured to cause the display to display, via the GUI, at least one metric from among a first metric that relates to a number of floors required by the allocation and a second metric that relates to an occupancy percentage of each floor.

14. The computing apparatus of claim 10, wherein the processor is further configured to:

cause the display to display, via the GUI, a prompt that facilitates receiving a fourth input that includes adjustments to the information received in the third input;

determine, based on each of the first input, the second input, and the fourth input, an updated allocation of each respective one of the plurality of persons to an updated corresponding space within the building and an updated respective schedule for each respective one of the plurality of persons to occupy the corresponding space; and cause the display to display, via the GUI, a result of the determination of the updated allocation and the updated schedules.

15. A non-transitory computer readable storage medium storing instructions for allocating space in a building, the storage medium comprising executable code which, when executed by a processor, causes the processor to:

receive a first input that includes information that relates to a plurality of persons that intend to occupy space within the building;

receive a second input that includes information that relates to building specifications;

receive a third input that includes information that relates to constraints that are mandatory and preferences that are not mandatory; and determine, based on each of the first input, the second input, and the third input, an allocation of each respective one of the plurality of persons to a corresponding space within the building and a respective schedule for each respective one of the plurality of persons to occupy the corresponding space, wherein the corresponding space includes a particular floor within the building, wherein the executable code is further configured to cause the processor to determine the allocation and the respective schedule by applying an artificial intelligence (AI) algorithm that is configured to satisfy all of the mandatory constraints and to optimize a satisfaction of the preferences, wherein the AI algorithm is further configured to minimize a number of floors within the building that are occupied as a result of the allocation, and wherein the processor is further caused to:

adjust the allocation or the respective schedule for modification of an occupancy level of the particular floor within the building that results in reduction of energy consumption for the particular floor.

* * * * *